(12) United States Patent
Olvera-Hernandez et al.

(10) Patent No.: US 8,274,946 B2
(45) Date of Patent: Sep. 25, 2012

(54) SWITCHING MULTIPLE LINK LAYER RESOURCES FOR MEDIA INDEPENDENT HANDOVER

(75) Inventors: Ulises Olvera-Hernandez, Kirkland (CA); Khalid S. Hossain, Montreal (CA); Shamim Akbar Rahman, Montreal (CA); Mahmoud Watfa, Montreal (CA); Juan Carlos Zuniga, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 570 days.

(21) Appl. No.: 11/857,007

(22) Filed: Sep. 18, 2007

(65) Prior Publication Data

US 2008/0069049 A1 Mar. 20, 2008

Related U.S. Application Data

(60) Provisional application No. 60/826,024, filed on Sep. 18, 2006, provisional application No. 60/894,370, filed on Mar. 12, 2007.

(51) Int. Cl.
*H04W 4/00* (2009.01)
(52) U.S. Cl. .................................. 370/331; 455/436
(58) Field of Classification Search .................. 370/331; 709/222, 208; 455/436, 437, 444
See application file for complete search history.

(56) References Cited

U.S. PATENT DOCUMENTS

| 5,509,121 | A | 4/1996 | Nakata et al. |
| 7,483,984 | B1 | 1/2009 | Jonker et al. |
| 7,787,391 | B2 | 8/2010 | Sakai et al. |
| 2004/0199599 | A1* | 10/2004 | Nichols et al. ............... 709/208 |
| 2006/0140150 | A1 | 6/2006 | Olvera-Hernandez et al. |
| 2006/0187882 | A1 | 8/2006 | Kwak et al. |
| 2006/0259598 | A1* | 11/2006 | Kim et al. ..................... 709/222 |
| 2008/0026756 | A1* | 1/2008 | Harris et al. .................. 455/436 |
| 2008/0051092 | A1* | 2/2008 | Park et al. ..................... 455/437 |
| 2008/0318580 | A1* | 12/2008 | Zhong et al. .................. 455/444 |
| 2009/0252120 | A1* | 10/2009 | Kim et al. ..................... 370/331 |
| 2010/0048213 | A1* | 2/2010 | Kim et al. ..................... 455/436 |

FOREIGN PATENT DOCUMENTS

| WO | 2006/084241 | 8/2006 |
| WO | 2006/109977 | 10/2006 |

OTHER PUBLICATIONS

Olvera, "IEEE P802.21/D01.09 Draft IEEE Standard for Local and Metropolitan Area Networks: Media Independent Handover Services, Normative Text Proposal Handling of LinkSwitch Command Towards Link layers", (Sep. 11, 2006).

Koora et al., "Media Independent Handover—Discussion on IDs in primitives," IEEE 802.21 Media Independent Handover Services (Mar. 2006).

(Continued)

*Primary Examiner* — Albert T Chou
(74) *Attorney, Agent, or Firm* — Volpe and Koenig, P.C.

(57) ABSTRACT

A method for controlling behavior of lower layer links related to media independent handover (MIH) of a mobile user comprises sending a MIH link actions request primitive from a MIH User entity to a MIH function (MIHF) for requesting actions to be executed on a set of lower layer links to heterogeneous radio access technology (RAT) networks. The primitive includes parameters that indicate the requested actions and an execution time delay. Confirmation primitives are sent back the MIH User entity to convey the results of the execution attempts on the requested actions.

29 Claims, 4 Drawing Sheets

OTHER PUBLICATIONS

LAN MAN Standards Committee of the IEEE Computer Society, "Draft Standard For Local And Metropolitan Area Networks: Media Independent Handover Services", IEEE P802.21/D04.00, (Feb. 2007).

LAN MAN Standards Committee of the IEEE Computer Society, "Draft Standard For Local And Metropolitan Area Networks: Media Independent Handover Services", IEEE P802.21/D07.00, (Jul. 2007).

LAN MAN Standards Committee of the IEEE Computer Society, "Draft Standard For Local And Metropolitan Area Networks: Media Independent Handover Services", IEEE P802.21/D01.09, (Sep. 2006).

LAN MAN Standards Committee of the IEEE Computer Society, "Draft Standard for Local and Metropolitan Area Networks: Media Independent Handover Services," IEEE P802.21/D01.00 (Mar. 2006).

Olvera, "IEEE P802.21/D01.09 Draft IEEE Standard For Local And Metropolitan Area Networks: Media Independent Handover Services, Normative Text Proposal Handling Of LinkSwitch Command Towards Link layers," 21-06-0737-01-0000-SwitchCommnad.doc (Sep. 11, 2006).

Olvera, "IEEE 802.21 Media Independent Handover: Link_Switch Command, Blueprint, Presented at IEEE 802.21 session #NN in City", (Sep. 13, 2006).

Olvera, "IEEE P802.21/D01.09 Draft IEEE Standard for Local and Metropolitan Area Networks: Media Independent Handover Services, Normative Text Proposal handling of LinkSwitch command towards Link Layers," 21-06-0737-00-0000-SwitchCommnad.doc (Sep. 2006).

Stein, "Survey of IEEE802.21 Media Independent Handover Services," http://www.cse.wustl.edu/~jain/cse574-06/ftp/handover/index.html (Apr. 24, 2006).

* cited by examiner

SWITCHING MULTIPLE LINK LAYER RESOURCES FOR MEDIA INDEPENDENT HANDOVER

CROSS REFERENCE TO RELATED APPLICATIONS

This application claims the benefit of U.S. provisional application Nos. 60/826,024, filed on Sep. 18, 2006, and 60/894,370 filed on Mar. 12, 2007, which are incorporated by reference as if fully set forth.

FIELD OF INVENTION

This disclosure relates to mobile user handover in communication systems. In particular, handling of multiple link layer resources for media independent handover is disclosed.

BACKGROUND

The IEEE 802.21 draft standard is being developed to provide a framework for enabling the exchange of support messages (i.e. 802.21 information, events, and commands) between network and mobile nodes, to achieve seamless media independent handover (MIH). The IEEE 802.21 group develops mechanisms and procedures that aid in the execution and management of inter-system handovers.

A media independent handover function (MIHF) is a framework defined by 802.21 that facilitates handover across heterogeneous access networks and to help MIH users (e.g., mobile users, mobile nodes) experience a better performance during seamless handover. The MIH user makes handover decisions based on input from the MIHF. The MIHF is a function implementation of MIH services and is treated as a logical entity implemented in both MIH users and in the network.

Figure 1:
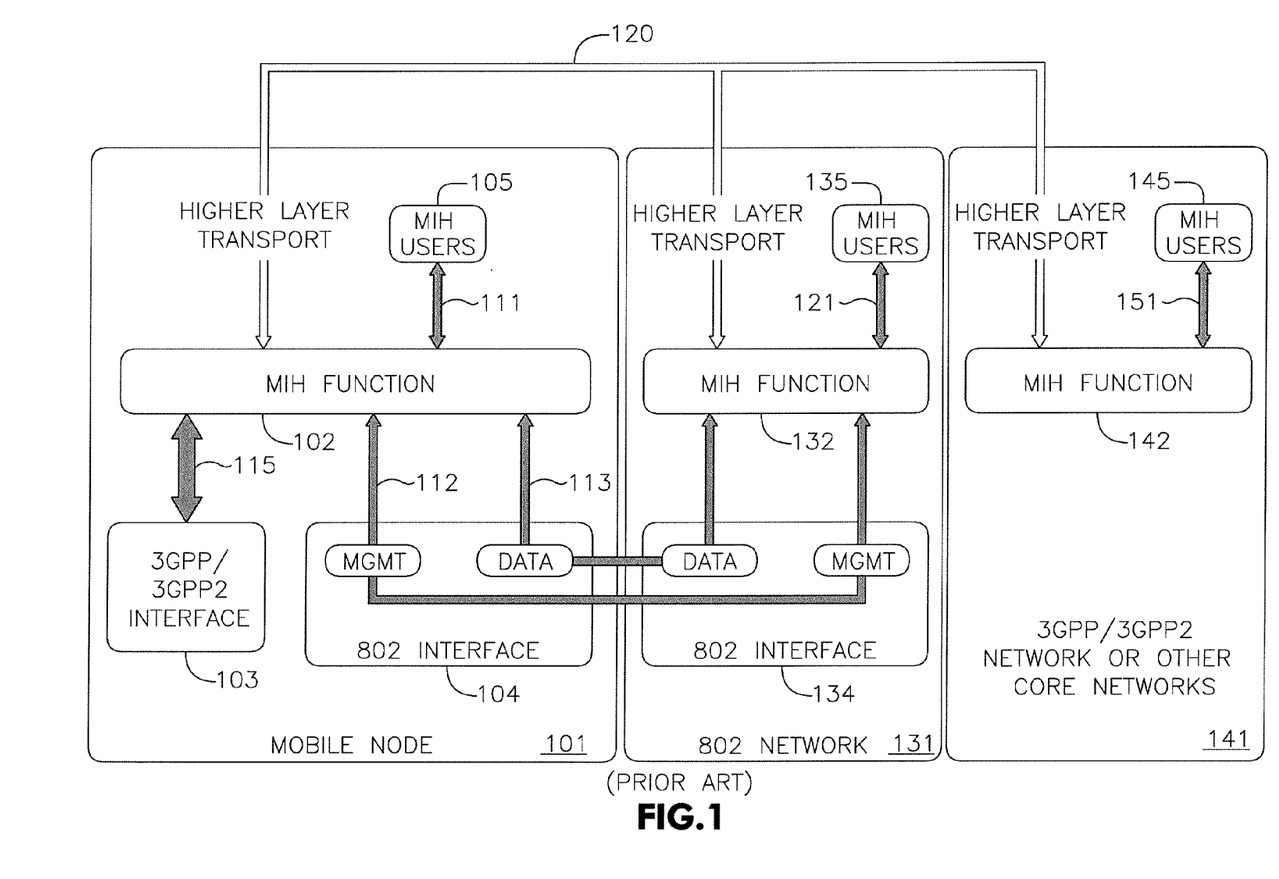
FIG. 1 is a block diagram of a media independent handover function (MIHF) of a mobile node with interfaces to MIHFs of heterogeneous networks in accordance with the prior art.

FIG. 1 is a block diagram of layer link connections between MIH-enabled nodes and networks using MIH functional entities. A mobile node 101 is shown comprising a MIHF 102, a lower layer interface 103 for 3GPP/3GPP2 networks, a lower layer interface entity 104 for IEEE 802 networks, and one or more MIH Users 105.

The MIHF 102 is coupled to the heterogeneous access networks (3GPP/802) using MIH local interface 115 and MIH message transports 112, 113. The MIH user(s) 105 communicates to the MIHF 102 in mobile node 101 via MIH local interface 111. The MIH User is defined in 802.21 as an entity that uses the services provided by the MIHF; the MIH user is typically a policy driven functional entity and invokes the MIHF to manipulate the lower layers for media dependent or independent services. Higher layer transport connections 120, which are at L3 layer, allow the MIHF 102 to communicate with remote MIHFs 132 and 142 of the 802 network 131 and the 3GPP network 141, respectively. When connected to the 802 network 131, the mobile node 101 may alternatively use L2 layer transport interfaces 112 and 113 for management and data transfer between the functional entity 802 interfaces 104 and 134.

Figure 2:
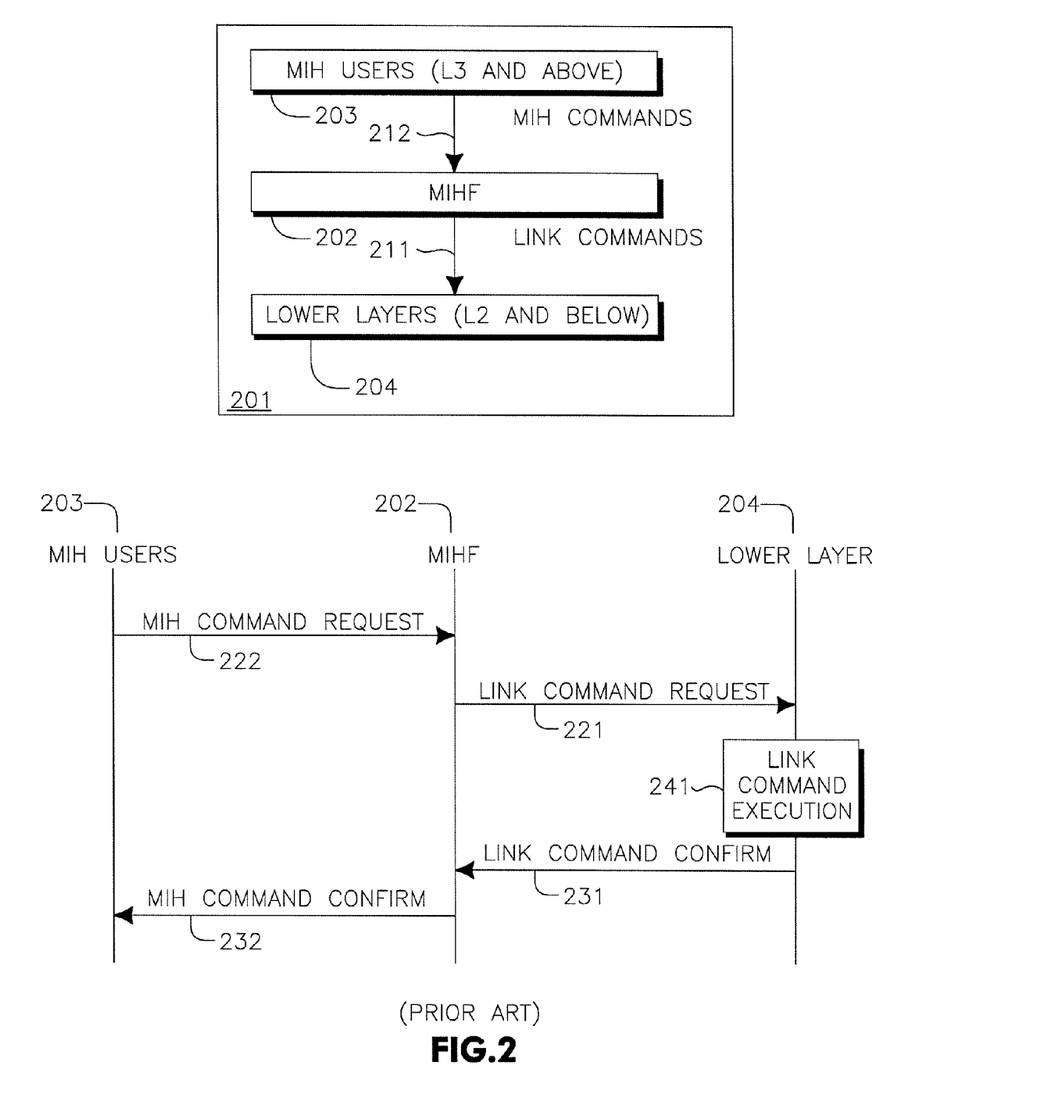
FIG. 2 is a signaling diagram of command service flow for MIH commands and Link commands for a local entity protocol stack in accordance with the prior art.

The MIHF provides services to MIH users through a single media-independent interface, the MIH service access point (MIH-SAP), which is a point in a protocol stack where services of a lower layer are made available to a next higher layer. The MIHF obtains services from lower layers (i.e., link layers) through a variety of media-dependent interfaces (media specific SAPs). One type of service handled by the MIHF is a Command Service which is broadly divided into two categories: Link Commands and MIH Commands. FIG. 2 shows a block diagram of a protocol stack of a mobile node 201 comprising an MIHF 202, which receives MIH commands 212 from the local MIH User or Users 203, which operates on upper layer L3 and above. Link Commands 211 are sent by the MIHF 202 and directed to lower layers 204, which are on L2 and below, and include for example MAC, radio resource management, and physical layer (PHY). Although Link Commands 211 originate from the MIHF 202, these commands are executed on behalf of the MIH Users. The MIH Commands 212 are generated by the MIH Users and sent to the MIHF 202 (e.g., from upper layer mobility protocol to MIHF, or from policy engine to MIHF).

The Link commands 211 and MIH commands 212 are executed using service primitives, which are defined in 802.21 as a conceptual abstraction to describe the information transfer that occurs between an upper layer user and the present layer in the provisioning of a service. Each service primitive conveys one or more information parameters. As shown in FIG. 2, the MIHF 202 receives MIH primitives from the MIH User 203, such as an MIH Command request 222, and determines whether or not one or more link layer primitives, such as Link Command request 221, should be triggered in order to satisfy the request from the MIH User 203. Likewise, the MIHF 202 may generate MIH primitives toward the MIH User 203, shown as an MIH Command confirm 232, upon receipt of one or more link layer primitives coming from lower link layers 204, shown as Link Command confirm 231. Such confirmation primitives report results of the Link Command Execution 241.

The 802.21 link layer primitives may be mapped directly or indirectly into existing primitives supported by other link layer technologies. In this regard, the link layer primitives described by 802.21 serve as a "blueprint" of what is expected from a specific link layer technology and therefore a mapping can be established between these "blueprint" primitives and one or more existing primitives within a relevant link layer technology, such as 802.11, 802.16 or even 3GPP/3GPP2.

With regard to command services, and in particular commands that allow the manipulation of link layer resources, a method of performing a mapping of handover commands coming from the MIH user and link commands triggered by the MIHF is needed. Early drafts of the 802.21 standard provide for a command to order actions on the existing link layer connection. These actions are only applicable to one link (i.e., the current link) and the command only flows from the MIH User to the MIHF. Although there is some indication that some action can be taken by the MIHF on receipt of this command, there are no standardized primitives that support such procedures. Thus, it currently undefined how these procedures should be carried out.

Prior drafts of the 802.21 standard support a number of MIH commands from the MIH User to the MHIF that might cause a service flow to switch from one link layer connection to another. For example, there are MIH messages to command other link-specific tasks, such as powering up, powering down, and changing transmission and/or reception mode. Although there are several MIH primitives that can trigger link layer actions, there are no corresponding 802.21 link layer counterpart or "blue print" primitives, as is the case with other commands, events and information services.

Prior drafts of the 802.21 standard (e.g., version D01.09) make references to Link commands that should be used by the MIHF when it receives MIH commands affecting link layer connection. However, these link layer commands remain undefined. Additionally, these existing MIH commands only allow actions to be taken on one link at a time, and it is not clear what action should be taken on the new link layer connection that needs to be established for the handover to be executed.

In 802.21 standard drafts subsequent to version D01.09, a primitive called Link Action has no way of indicating to the link layer to perform actions such as scanning on a link or enabling/disabling transmission/reception. Additionally, there exists an MIH primitive, called MIH Switch, to specifically command link actions to be performed on the old link during a handover scenario from an "old link" to a "new link". However, this MIH Switch primitive does not allow specification of actions to be performed on the new link. The primitive is also limited to only interacting with two links, which is problematic for cases when interaction with more than two links is required.

SUMMARY

A media independent handover (MIH) mechanism is introduced that allows a mobile user to command action on more than one lower layer link at a time, where the lower layers include media access control (MAC), radio resource management, and physical (PHY) layers. The mobile user comprises one or more MIH User functional entities, an MIH function, and heterogeneous network interfaces. Each action command and lower layer link relates to services available on heterogeneous radio access technology (RAT) networks, such as 3GPP/3GPP2 and IEEE 802 networks. The MIH mechanism allows commanding a link to remain connected to the network without the need to generate traffic, and allows the setting of specific execution times of requested actions to take effect on the link layer connections.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology media independent handover (MIH) user includes but is not limited to a wireless transmit/receive unit (WTRU), user equipment (UE), a mobile node, a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 3:
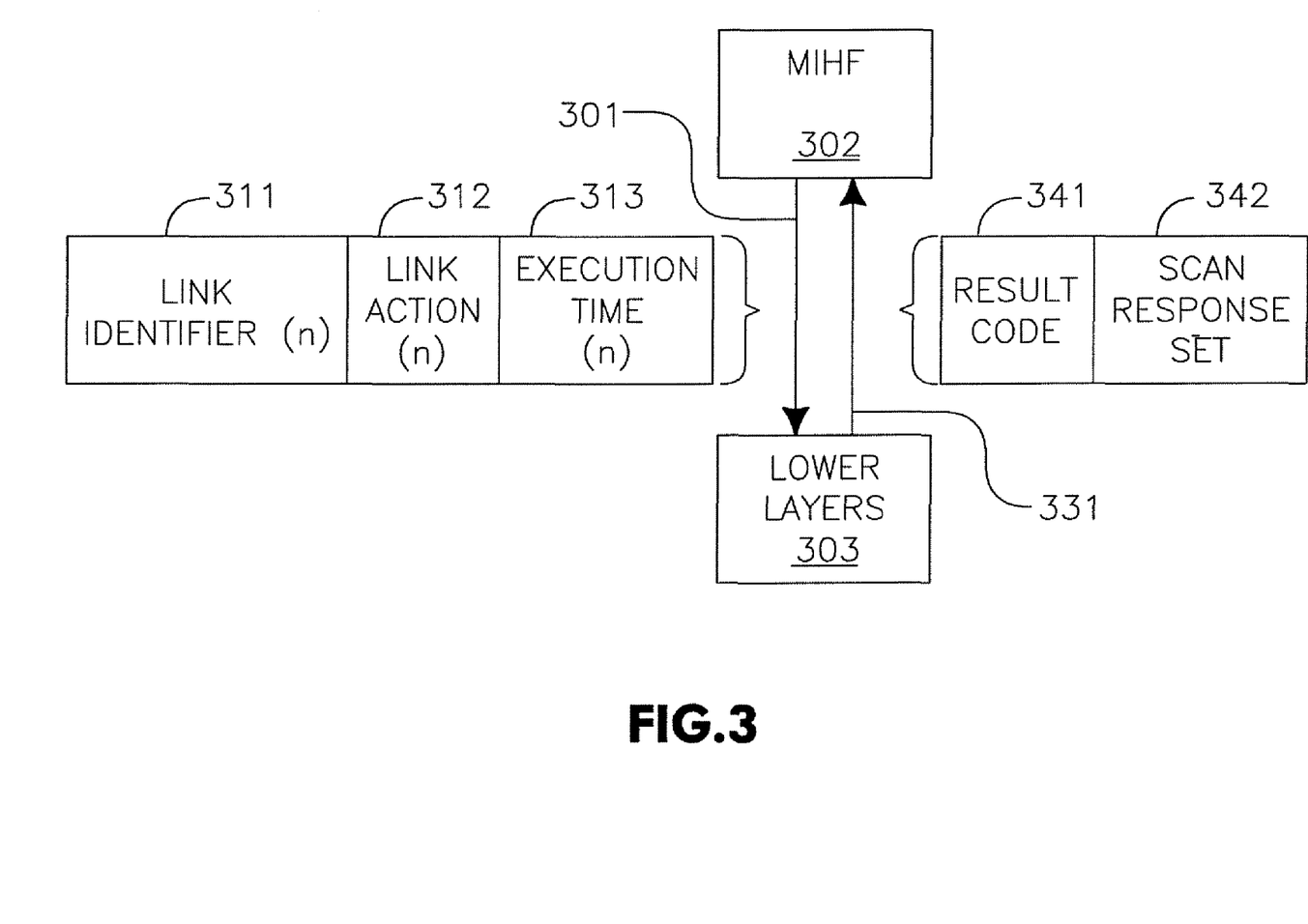
FIG. 3 is a signaling diagram of service primitives for requesting actions on specific link layer connections.

In a first embodiment, a service primitive is introduced to characterize the switching of link layer (i.e., lower layer) connections from the MIHF directed towards multiple link layers. FIG. 3 is a signaling diagram for such a service primitive represented as a Link Action request primitive 301. The MIHF 302 requests actions on a lower layer 303 link that enables optimal handling of link layer resources for the purpose of handover operations. The link layer can be ordered to remain active, to shut down or come up active and to remain in stand-by mode.

As shown in FIG. 3, the Link Action request primitive 301 comprises parameter sets for n links, each parameter associated with a specific link layer connection Link(1) through Link(N), for n=(1 to N). The parameters of the Link Action request primitive 301 include, but are not limited to Link Identifier(n) 311, Link Actions(n) 312, and Execution Time (n) 313.

One or more possible actions may be requested on one or more link connections as identified in the parameters of the Link Action request primitive 301. The parameter Link Identifier(n) 311 indicates the Link(n) upon which the requested link action will act upon. The parameter Link Actions(n) 312 specifies an action on the link connection during handover. The parameter Execution Time(n) 313 is a duration of time to elapse (i.e., a time delay) prior to the execution of the associated link action.

Table 1 presents a summary of the possible actions that the MIHF 302 can perform on a link layer connection upon request from the MIH User, in accordance with the defined and generated Link Action primitive 301.

TABLE 1

| Parameter Name | Type | Valid Range | Description |
| --- | --- | --- | --- |
| LinkIdentifier(n) | Identifier | Any valid individual or group identifier | Identifies link which action(s) as defined by the LinkAction field shall be acted upon |
| LinkActions(n) | Link Action | Any valid value of Link Action | Specifies the suggested action on link during handover. Combinations of the below choices are allowed.<br>Bit #0: LINK_DISCONNECT<br>Bit #1: LINK_LOW_POWER<br>Bit #2: LINK_POWER_DOWN<br>Bit #3: LINK_NO_ACTION<br>Bit #4: LINK_RESOURCE_RETAIN<br>Bit #5: DATA_FORWARDING_REQUEST<br>Bit #6: BL_CASTING_REQUEST<br>Bit #7: HANDOVER_CANCEL<br>Bit #8: POWER_UP<br>Bit #9: REMAIN_STANDBY<br>Bit#10: LINK_SCAN |

TABLE 1-continued

| Parameter Name | Type | Valid Range | Description |
|---|---|---|---|
| | | | Bit#11: LINK_TX_ON
Bit#12: LINK_TX_OFF
Bit#13: LINK_RX_ON
Bit#14: LINK_RX_OFF
Bit #15-31: Reserved |
| ExecutionTime(n) | Timer | 0 ms-5000 ms | Time elapsed before action needs to be taken, if ExecutionTime = 0 then the action is expected to be taken immediately. |

The MIHF 302 generates the Link Action request primitive 301 upon request from the MIH User to perform an action on a pre-defined link layer connection. Upon receipt of the Link Action request primitive 301, the link layer technology supporting the current link or link layer connections performs the action specified by the Link Actions(n) 312 parameter in accordance with procedures specified within the relevant standards organization and at the time specified by the Execution Timer(n) 313 parameter.

FIG. 3 shows a Link Action confirmation primitive 331 that is used by lower layers 303 (i.e., link layers) to provide an indication of the result of the actions executed on the current link layer connection. This service primitive comprises a Result Code 341 parameter and an optional Scan Response Set 342 parameter. This primitive is generated by lower layers 303 to communicate the result of the actions executed on the link layer connection. Upon receipt of this primitive 331, the MIHF 302 determines the relevant MIH command that needs to be used to provide an indication to the MIH user of the actions performed on the current link layer connection. If the action specified by the Link Action request 301 was of type LINK_SCAN, the optional Scan Response Set parameter 342 field shall be included in the Link Action confirm response 331.

Tables 2 and 2A summarize the parameters used by the lower layers 303 with respect to the Link Action confirmation primitive 331.

TABLE 2

| Name | Type | Valid Range | Description |
|---|---|---|---|
| ResultCode | Enumerate | Success
Failure
Rejection | Result of the actions specified in the Link_Action.request primitive Failure Codes are given as follows:
0 = ResourceUnavailable
1 = Resource Busy
2-31 Reserved |
| ScanResponse Set (optional) | Set of scan responses | N/A | A list of discovered links and related information. (See Table 2A below) |

TABLE 2A

| Name | Type | Valid Range | Description |
|---|---|---|---|
| Link Identifier | Link ID | N/A | Identifier of the specified links to scan The PoA MAC Address is included (if available). |
| Signal Strength | Integer | N/A | Signal strength of the scanned link. |

Figure 4:
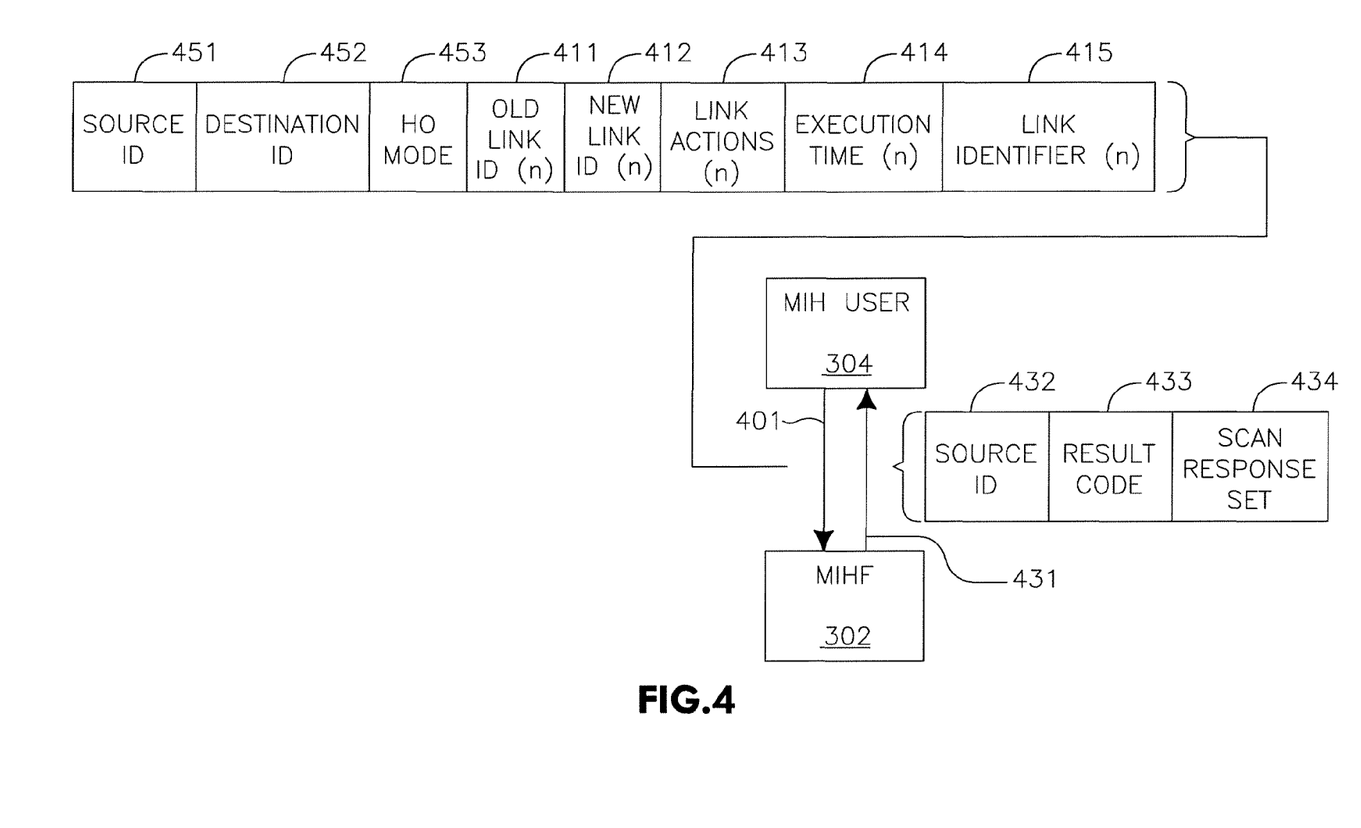
FIG. 4 is a signaling diagram of a service primitive for requesting actions by an MIH user.

FIG. 4 is a signaling diagram for an MIH Action Request primitive 401, which comprises parameter sets for n links, each parameter being associated with a specific link layer connection Link(1) through Link(N), with n=(1 to N). The MIH Link Actions primitive 401 is invoked by the MIH User 304 when attempting to control the behavior of multiple lower layer links. This primitive 401 triggers the Link Action Request primitive 301 by the MIHF 302, which is followed by execution of the requested action at the link layers 303. The parameters of the MIH Action Request primitive 401 include one or more of the following, alone or in combination: a Source Identifier 451, a Destination Identifier 452, a Handover mode 453, a New Link Identifier(n) 411, an Old Link Identifier(n) 412, Link Actions(n) 413, an Execution Time(n) 414, and a Link Identifier(n) 415. The sequence of parameters as shown in FIG. 4 is by way of example, and other variations may be used.

The MIH User 304 generates the MIH Link Actions request primitive 401 to order specific action on one or more links. Upon receipt of the MIH Link Action command, the MIHF 302 may use the Link Actions 413 parameter to order the relevant link layer technology to perform an action on the link as specified by the MIH User 304, preferably using the Link Identifier(n) 415. The actions that need to be performed are signaled using the parameter Link Actions(n) 413. The MIHF 302 function executes the action following the time delay as specified by Execution Time(n) 414 parameter. The Source Identifier 451 parameter identifies the entity where the request is initiated, which is particularly useful for cases when a remote MIH User entity makes the request. The Destination Identifier 452 parameter identifies the destination MIHF of the request or response, which may be a local MIHF or a remote MIHF. The Handover Mode 453 parameter specifies the make-before-break or break-before-make sequence of the handover from the old link to the new link, which are identified by the Old Link Identifier (n) 411 and the New Link Identifier (n) 412 parameters, respectively. The Link Identifier(n) 415 parameter indicates the link type, the MAC address, and/or the MAC Point of attachment (PoA) address. The Execution Time(n) 414 parameter indicates a requested time delay for the execution of the requested action on the link. A time delay of zero may be specified in this parameter to request that the action be executed upon receipt of the Link Action command.

Table 3 summarizes the parameters that may be included in the MIH Link Actions request primitive 401, and identifies possible link actions that may be included in the Link Actions (n) 413 parameter.

TABLE 3

| Parameter Name | Type | Valid Range | Description |
|---|---|---|---|
| Source Identifier | Identifier | Any valid individual or group Identifier | The identifier of entity where the request is initiated. This field may be optionally left empty if the command is local. |
| Destination Identifier | Identifier | Valid MIHF Identifier | The destination identifier of request or response. This is the identifier of local or peer MIHF. |
| Handover Mode | Enumerate | Make-before-Break Break-before-Make | The handover mode decides the sequence of the execution of link command. If it is make-before-break, the Link Connect of the new link is executed before Link Disconnect of old link; if it is break-before-make, Link Connect is after the Link Disconnect |
| New Link (n) Identifier | Identifier | N/A | Identifier of new link |
| Old Link (n) Identifier | Identifier | N/A | Identifier of old link |
| Link Identifier (n) | Identifier | N/A | Link Type, MAC address, MAC point of attachment (PoA) address |
| Link Actions (n) | Link Action | Any valid value of Link Action | Specifies the suggested action on link during handover. Combination of the below choices are allowed.<br>Bit #0: LINK_DISCONNECT<br>Bit #1: LINK_LOW_POWER<br>Bit #2: LINK_POWER_DOWN<br>Bit #3: LINK_NO_ACTION<br>Bit #4: LINK_RESOURCE_RETAIN<br>Bit #5: DATA_FORWARDING_REQUEST<br>Bit #6: BI_CASTING_REQUEST<br>Bit #7: HANDOVER_CANCEL<br>Bit #8: POWER_UP<br>Bit #9: REMAIN_STANDBY<br>Bit#10: LINK_SCAN<br>Bit#11: LINK_TX_ON<br>Bit#12: LINK_TX_OFF<br>Bit#13: LINK_RX_ON<br>Bit#14: LINK_RX_OFF<br>Bit #15-31: Reserved |
| ExecutionTime | Timer | 0 ms-10000 ms | Time elapsed before action needs to be taken, if ExecutionTime = 0 then the action is expected to be taken immediately. |

FIG. 4 shows an MIH Link Actions Confirm primitive 431 which is used by the MIHF 302 to report the link command execution result at the lower layer 303 of the MIH Link Actions request 401. The MIH Link Actions Confirm primitive 431 comprises a Source Identifier 432 parameter, a Result Code 433 parameter, and an optional Scan Response Set 434 parameter. The MIH Link Actions Confirm primitive 431 is generated when the MIHF 302 receives the execution result of the Link Action command 301 from the lower link layer. Recall that the execution result is reported to the MIHF 302 via the Link Action confirm primitive 331, which in turn triggers the MIH Link Actions confirm primitive 431. Upon receipt of the MIH Link Actions Confirm primitive 431, the MIH User 304 makes necessary assessments.

The Source Identifier 432 parameter identifies the MIHF that invoked the MIH request primitive 401. The Result Code 433 parameter indicates the result of the attempt to perform the requested lower link layer actions, such as an indication of a successful execution, a failed execution, or a rejected execution. If the action specified by the MIH Link Actions request primitive 301 was of type LINK_SCAN, the optional Scan Response Set parameter 434 field shall be included in the MIH Link Actions confirm response 431.

Table 4 summarizes the parameters of the MIH Link Actions confirm primitive 431.

TABLE 4

| Name | Type | Valid Range | Description |
|---|---|---|---|
| Source Identifier | Identifier | Valid MIHF identifier | Identification of the invoking MIHF, which initiated the request primtive |
| ResultCode | Enumerate | Success; Failure; Rejected | Result of trying to perform the link actions |
| ScanResponseSet (optional) | Set of scan responses | N/A | A list of discovered points of attachment and related information. (See Table 2A above). |

Although the features and elements of the embodiments are described in particular combinations, each feature or element can be used alone without the other features and elements of the preferred embodiments or in various combinations with or without other features and elements. The methods described may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless transmit/receive unit (WTRU) that includes an interworking function and a plurality of lower layer devices, wherein the lower layer devices are capable of communicating using respective different radio access technologies, the method comprising:
    the interworking function receiving a first link actions request primitive from an upper layer entity, wherein the first link actions request primitive includes a plurality of parameter sets to trigger multiple independent actions on multiple links that are associated with a plurality of lower layer devices, wherein each parameter set is associated with a specific link and includes:
        a link action parameter, wherein a value of the link action parameter indicates an action to be taken by a corresponding lower layer device; and
        an execution time parameter that indicates a time to elapse before the action needs to be taken by the corresponding lower layer device;
    the interworking function sending a second link actions request primitive to the plurality of lower layer devices including a plurality of parameter sets to order each lower layer device to perform the action indicated by the corresponding link action parameter for the lower layer device; and
    each of the lower layer devices performing the action indicated by the corresponding link action parameter for the lower layer device on a condition that the time indicated by the corresponding execution time parameter has elapsed.

2. The method of claim 1, wherein the value of the link action parameter indicates at least that the action to be taken by the lower layer device is one of the following actions: to shut down, to remain active, to perform a scan, or to come up active and remain in stand-by mode.

3. The method of claim 1, wherein the value of the link action parameter indicates at least that the action to be taken by the lower layer device is one of the following actions:
    a link disconnect;
    a link low power consumption adjustment;
    a link power down;
    a link no action;
    a link resource retain action that disconnects the link while retaining the resources for the link to allow efficient reconnection;
    a data forwarding request;
    a bi-casting request;
    a handover cancellation;
    a power up; or
    a remain on standby action.

4. The method of claim 1, wherein the first link actions request primitive further includes a destination identifier parameter that identifies the interworking function.

5. The method of claim 1, wherein the second link actions request primitive includes a link action parameter that specifies the action requested by the upper layer entity.

6. The method of claim 1, wherein the second link actions request primitive includes an execution time parameter that indicates a time to elapse before the requested action needs to be taken.

7. The method of claim 1, wherein the first link actions request primitive further includes a link identifier parameter for each of the one or more lower layer devices.

8. The method of claim 1, further comprising:
    the interworking function sending a link actions confirm primitive indicating a result of a requested action executed by the lower layer device.

9. The method of claim 8, wherein the link actions confirm primitive comprises a result code parameter that indicates the result of any actions specified in the first link actions request primitive.

10. The method of claim 9, wherein the result code parameter provides an indication including one of the following: success; failure; and rejection.

11. The method of claim 10, wherein the failure indication further includes an indication of an unavailable resource or a busy resource.

12. The method of claim 8, wherein the link actions confirm primitive comprises a scan response set parameter that identifies discovered points of attachment for the links.

13. The method of claim 1, wherein an execution time of zero for the execution time parameter indicates that the action is to be performed immediately.

14. The method of claim 1, wherein the interworking function is a Media Independent Handover (MIH) Function (MIHF), the first link actions request primitive is an MIH link actions request primitive, and the upper layer entity is an MIH User entity.

15. A wireless transmit/receive unit (WTRU) comprising:
    a plurality of lower layer devices, wherein the lower layer devices are capable of communicating using respective different radio access technologies;
    an interworking function configured to:
        receive a first link actions request primitive from an upper layer entity, wherein the first link actions request primitive includes a plurality of parameter sets to trigger multiple independent actions on multiple links that are associated with a plurality of lower layer devices, wherein each parameter set is associated with a specific link and includes:
            a link action parameter, wherein a value of the link action parameter indicates an action to be taken by a corresponding lower layer device; and
            an execution time parameter that indicates a time to elapse before the action needs to be taken by the corresponding lower layer device; and
        send a second link actions request primitive to the plurality of lower layer devices including a plurality of parameter sets to order each lower layer device to perform the action indicated by the corresponding link action parameter for the lower layer device;

wherein each of the lower layer devices is configured to perform the action indicated by the corresponding link action parameter on a condition that the time indicated by the corresponding execution time parameter has elapsed.

16. The WTRU of claim 15, wherein the value of the link action parameter indicates at least that the action to be taken by the lower layer device is one of the following actions: to shut down, to remain active, to perform a scan, or to come up active and remain in stand-by mode.

17. The WTRU of claim 15, wherein the value of the link action parameter indicates at least that the action to be taken by the lower layer device is one of the following actions:
 a link disconnect;
 a link low power consumption adjustment;
 a link power down;
 a link no action;
 a link resource retain action that disconnects the link while retaining the resources for the link to allow efficient reconnection;
 a data forwarding request;
 a bi-casting request;
 a handover cancellation;
 a power up; or
 a remain on standby action.

18. The WTRU of claim 15, wherein the first link actions request primitive further includes a destination identifier parameter that identifies the interworking function.

19. The WTRU of claim 15, wherein the second link actions request primitive includes a link action parameter that specifies the action requested by the upper layer entity.

20. The WTRU of claim 15, wherein the second link actions request primitive includes an execution time parameter that indicates a time to elapse before the requested action needs to be taken.

21. The WTRU of claim 15, wherein the first link actions request primitive further includes a link identifier parameter for the lower layer device.

22. The WTRU of claim 15, wherein the action specified in the first link actions request primitive is performed in accordance with procedures specified by a standards organization relevant to the link connection.

23. The WTRU of claim 15, wherein the interworking function is further configured to send a link actions confirm primitive to the upper layer entity indicating a result of a requested action executed on a lower layer device.

24. The WTRU of claim 23, wherein the link actions confirm primitive comprises a result code parameter that indicates the result of any actions specified in the first link actions request primitive.

25. The WTRU of claim 24, wherein the result code parameter provides an indication including one of the following: success; failure; and rejection.

26. The WTRU of claim 25, wherein the failure indication further includes an indication of an unavailable resource or a busy resource.

27. The WTRU of claim 23, wherein the link actions confirm primitive comprises a scan response set parameter that identifies discovered points of attachment for the links.

28. The WTRU of claim 15, wherein an execution time of zero for the execution time parameter indicates that the action is to be performed immediately.

29. The WTRU of claim 15, wherein the interworking function is a Media Independent Handover (MIH) Function (MIHF), the first link actions request primitive is an MIH link actions request primitive, and the upper layer entity is an MIH User entity.

* * * * *